United States Patent [19]

Rasmussen et al.

[11] Patent Number: 4,622,719
[45] Date of Patent: Nov. 18, 1986

[54] CLAMP FOR HOSES AND THE LIKE

[75] Inventors: Jörgen S. Rasmussen, Hammersbach; Heinz Sauer, Ronneburg, both of Fed. Rep. of Germany

[73] Assignee: Rasmussen GmbH, Maintal, Fed. Rep. of Germany

[21] Appl. No.: 632,543

[22] Filed: Jul. 19, 1984

[30] Foreign Application Priority Data

Jul. 29, 1983 [DE] Fed. Rep. of Germany ....... 3327386

[51] Int. Cl.$^4$ .............................................. B65D 13/04
[52] U.S. Cl. ...................................... 24/20 R; 24/19;
24/27; 285/242
[58] Field of Search ............... 285/242, 254; 248/74.2;
24/19, 20 R, 20 S, 20 CW, 549, 550, 483, 27

[56] References Cited

U.S. PATENT DOCUMENTS

| | | | |
|---|---|---|---|
| 255,957 | 4/1982 | English | 24/550 |
| 972,372 | 10/1910 | Harding | 285/254 X |
| 2,194,317 | 3/1940 | O'Neill | 285/254 X |
| 2,285,850 | 6/1942 | Weeks | 24/19 |
| 3,106,758 | 10/1963 | Abbiati | 24/27 |
| 3,303,669 | 2/1967 | Oetiker | 24/20 R |
| 4,127,921 | 12/1978 | Townsend | 24/27 |
| 4,425,682 | 1/1984 | Hashimoto et al. | 24/20 R X |

FOREIGN PATENT DOCUMENTS

| | | | |
|---|---|---|---|
| 1958556 | 2/1979 | Fed. Rep. of Germany | 24/19 |
| 3105125 | 9/1982 | Fed. Rep. of Germany | 24/19 |
| 3026582 | 11/1982 | Fed. Rep. of Germany | 24/19 |

*Primary Examiner*—Peter A. Aschenbrenner
*Attorney, Agent, or Firm*—Peter K. Kontler

[57] ABSTRACT

A helically convoluted hose clamp has a central portion of rectangular cross-sectional outline, two intermediate portions of rectangular or V-shaped cross-sectional outline, and two radially outwardly extending end portions. The moments of resistance of the intermediate portions exceed the moment of resistance of the median portion, and the overall length of the clamp is in excess of 1.5 convolutions preferably between 2.5 and 2.6 convolutions. The inner diameter of the clamp is normally less than the outer diameter of the hose which is to be clamped on a pipe or the like. The length of the intermediate portions exceeds the length of the end portions, and each such intermediate portion can extend along an arc of approximately 360 degrees. Pronounced moments of resistance of the intermediate portions promote the clamping action and prevent the end portions from yielding and bending when they are acted upon to increase the inner diameter of the clamp.

11 Claims, 3 Drawing Figures

CLAMP FOR HOSES AND THE LIKE

BACKGROUND OF THE INVENTION

The present invention relates to clamps for hoses and the like, and more particularly to improvements in clamps of the type wherein a length of springy material is convoluted into the form of a spiral which is placed around a portion of a hose to clamp the latter against a piece of pipe or the like.

It is already known to convolute a length of metallic wire into a spiral which forms more than one and a half convolutions and whose end portions extend outwardly to allow for the application of a force which tends to expand the clamp so as to allow for insertion or extraction of a piece of hose or the like. The inner diameter of the clamp is normally smaller than the outer diameter of the object to be clamped thereby so that the clamp must be expanded by increasing its inner diameter before it can be slipped onto a hose or the like. In accordance with a presently known proposal, the clamp consists of round wire and its cross-sectional area is constant from end to end, i.e., the outline of the wire is constant as well as the quantity of metallic material per unit length of the wire. This brings about the drawback that, when the radially outwardly bent end portions of the clamp are acted upon to expand the clamp, they tend to flex without causing any appreciable increase in the inner diameter of the clamp. Moreover, the end portions of such clamps, or the portions which are adjacent to the end portions, furnish a relatively small clamping force so that the hose is not gripped with a pronounced force and the force is not uniform all the way around the circumference of the hose. Reference may be had, for example, to German Offenlegungsschrift No. 30 26 582, to German Pat. No. 19 58 556 and to German Offenlegungsschrift No. 31 05 125.

OBJECTS AND SUMMARY OF THE INVENTION

An object of the invention is to provide a novel and improved clamp which is not more expensive and/or more complex than heretofore known clamps but is better suited to furnish a predictable, long-lasting and uniform clamping and retaining action.

Another object of the invention is to provide a clamp which is constructed and configured in such a way that its end portions are not likely to bend in response to the application of forces which must be applied in order to expand the clamp preparatory to insertion or extraction of a hose or a like compressible or deformable object.

A further object of the invention is to provide a simple, compact, inexpensive and mass-producible clamp which can be used for a wide variety of purposes, which can be employed as a superior substitute for heretofore known clamps, and whose manipulation is not more complex than that of heretofore known clamps.

An additional object of the invention is to provide a novel and improved method of converting a length of metallic or plastic strip or band material into a clamp of the above outlined character.

The invention is embodied in an expandable annular clamp for hoses and like objects. The clamp comprises an elongated springy member forming at least one and a half neighboring convolutions whose inner diameters (in unexpanded condition of the clamp) are smaller than the outer diameter of the object around which the convolutions are to be applied. The member includes two substantially radially outwardly bent end portions, a centrally located median portion and two intermediate portions which flank the median portion and whose moments of resistance exceed the moment of resistance of the median portion. The length of the intermediate portions exceeds the length of the neighboring end portions.

In accordance with one embodiment of the invention, the cross-sectional area of the central part of the median portion of the springy member is less than the cross-sectional areas of the intermediate portions. For example, the cross-sectional area of the springy member can increase, at least substantially gradually, from the central part of the median portion toward the two end portions. Such member can constitute a flat metallic or plastic band.

Alternatively, the cross-sectional shape of the median portion can deviate from the cross-sectional shapes of the intermediate portions. For example, the median portion can have a substantially rectangular and each intermediate portion can have a substantially V-shaped cross-sectional outline.

The springy member can form more than two (e.g., 2.5 to 2.6) convolutions, and each intermediate portion can extend along an arc of substantially 360 degrees.

The novel features which are considered as characteristic of the invention are set forth in particular in the appended claims. The improved clamp itself, however, both as to its construction and the mode of making and manipulating the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
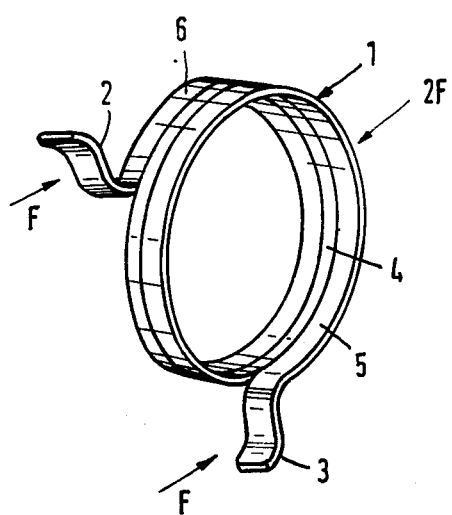
FIG. 1 is a perspective view of a clamp which embodies one form of the invention.

The expandible annular clamp which is shown in FIG. 1 is an elongated springy member 1 consisting of flat spring steel stock and forming at least one and a half neighboring convolutions, preferably between 2.5 and 2.6 convolutions. The springy member 1 comprises two substantially radially outwardly bent end portions or terminal portions 2, 3, a centrally located median portion 4, and two intermediate portions 5, 6 which flank the median portion 4 and are respectively flanked by the end portions 2, 3. In order to increase the inner diameter of the clamp, it is necessary to apply forces F to the end portions 2, 3 and to simultaneously apply a force 2F substantially radially of the springy member 1 and preferably midway between the end portions 2 and 3. The inner diameters of the convolutions of the member 1 are normally smaller than the outer diameter of a hose which is to be clamped by the improved device, i.e., it is necessary to expand the clamp before it can be slipped onto a hose, before a hose can be introduced into its interior, before a hose can be withdrawn from its interior or before it can be slipped off a hose. Reference may be had, for example, to U.S. Pat. No. 2,285,850 which shows a differently configured and constructed clamp around a piece of deformable hose. The improved clamp can urge an end portion of a hose into sealing engagement with a pipe, a nipple or the like. The forces F are preferably applied substantially tangentially of the convolutions of the springy member 1 when the inner diameters of the convolutions are to be increased for the purpose of placing the clamp around a hose or the like.

In accordance with a feature of the invention, and in contrast to the disclosure of the aforementioned U.S. Pat. No. 2,285,850, the cross-sectional area of the member 1 increases preferably gradually from the central part of the median portion 4 toward the two end portions 2 and 3 so that the moment of resistance of each of the two intermediate portions 5, 6 exceeds the moment of resistanoe of the median portion 4. The increase in cross-sectional area need not be very pronounced and need not even be readily discernible, i.e., the cross-sectional area of the median portion 4 can be substantially constant, at least to a casual observer. In the embodiment of FIG. 1, each of the intermediate portions 5, 6 extends along an arc of approximately or exactly 360 degrees, and the length of each intermediate portion exceeds the length of the respective (neighboring) end portion 2 or 3.

An important advantage of the feature that the moments of resistance of the intermediate portions 5, 6 of the springy member 1 exceed the moment of resistance of the median portion 4 is that, when the inner diameters of the convolutions are increased by the exertion on the aforementioned forces F and 2F, the end portions 2 and 3 are not bent radially outwardly. Instead, the entire clamp retains its at least substantially circular shape and the diameters of its convolutions increase to permit for insertion or extraction of the end portion of a hose. Moreover, the combined moment of resistance is greatest in the regions where the device must apply the maximal clamping force. Such maximal clamping force is applied in the regions where three convolutions of the springy member 1 are located next to each other.

Figure 2:
FIG. 2 is a cross-sectional view of one intermediate portion of a modified clamp.
Figure 3:
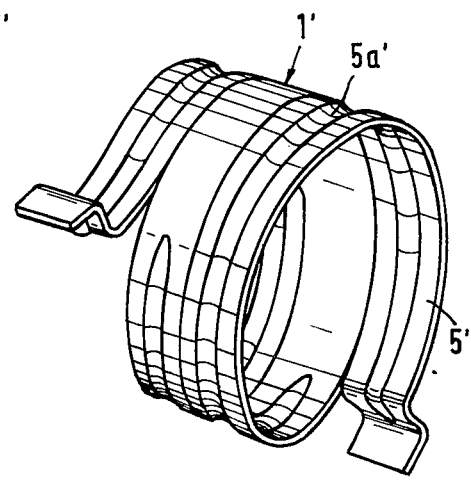
FIG. 3 is a perspective view of the modified clamp.

FIG. 2 shows a portion of one (5') of the intermediate portions of a modified clamp (shown in its entirety in FIG. 3) consisting of a substantially band- or strip-shaped member 1'. The illustrated intermediate portion 5' has a substantially V-shaped cross-sectional outline which ensures that its moment of resistance is greater than that of the median portion which, the same as the median portion 4 of FIG. 1, has a substantially rectangular cross-sectional outline. Thus, the moment of resistance of each intermediate portion can be increased by increasing its cross-sectional area with reference to the cross-sectional area of a part of or the entire median portion and/or by imparting to the intermediate portions a cross-sectional outline which deviates from that of the median portion. The clamp of FIGS. 2 and 3 can be made of an originally flat elongated band certain portions of which are deformed in a suitable punching, bending, stamping, upsetting or like machine of any known design so that the intermediate portions of the thus obtained product exhibit a substantially V-shaped cross-sectional outline. Certain other cross-sectional configurations can also be resorted to in order to increase the moments of resistance of the intermediate portions. The making of a groove (5a') in the intermediate portion 5' of the clamps shown in FIGS. 2 and 3 entails a certain reduction of its width, i.e., the width of the portion 5' will be somewhat less than the width of the respective median portion (not shown) if the device a part of which is shown in FIGS. 2 and 3 is made of a blank whose width is constant from end to end and which has a substantially rectangular cross-sectional outline. The configuration of the end portions of the device which is shown in FIGS. 2 and 3 is or can be the same as shown for the end portions 2, 3 of FIG. 1, and the manner of applying the forces F and 2F in order to increase the inner diameters of the convolutions is also the same as described above.

An important advantage of the improved clamp is that the aforediscussed dimensioning and/or configuration of the intermediate portions of the springy member 1 or 1' prevents the end portions from bending outwardly in response to the application of forces F and 2F. This is due to the fact that the more pronounced moments of resistance of the intermediate portions ensure that, when the clamp is to be expanded, the flow of power is in the circumferential direction which entails a gradual increase in the diameters of the convolutions without any, or without appreciable, departure from a circular shape. Inversely, when the application of forces F and 2F is terminated, the clamp contracts in a fully automatic way and forms a circular body which strongly clamps the hose against a piece of pipe, against a nipple or the like with a force which is uniform all the way around the clamped portion of the hose. The initial stressing of the clamp (upon application to a hose or the like) is sufficient to ensure adequate clamping action (i.e., without leakage of fluid between the internal surface of the hose and the external surface of a pipe or the like) even if the diameter of the clamped hose decreases with time, e.g., due to aging or for another reason. Thus, the improved clamp can compensate for contraction of the hose after a certain period of use to thus ensure a highly satisfactory, uniform and long-lasting sealing and retaining action all the way around the clamped portion of the hóse or a like object.

The feature that the cross-sectional area of the member 1 increases gradually from the central part of the median portion 4 toward the end portions 2, 3 constitutes one of the presently preferred modes of ensuring that the moments of resistance of the intermediate portions 5 and 6 will exceed the moment of resistance of the median portion 4 or, at the very least, the moment of resistance of the central part of the median portion 4. Moreover, this is desirable and advantageous on the additional ground that the springy member 1 need not be provided with steps or shoulders which would be necessary to provide for stepwise or stagewise increase of the moment of resistance from the median portion toward both end portions of the springy member 1. Such steps or shoulders would be likely to cause abrupt changes in the moment of resistance with attendant danger of breakage of the clamp in response to expansion. Still further, the cost of a clamp whose cross-sectional area increases gradually from the center toward the ends is reasonable, and such clamps can be mass-produced in available automatic machines. However, it is equally within the purview of the invention to replace the springy member 1 or 1' with a springy member wherein the moments of resistance of the intermediate portions are uniform from end to end and are different from the moment of resistance of the median portion, i.e., a springy member with a noticeable transition from the moment of resistance at each end of the median portion to the moment of resistance at the adjacent end of the corresponding intermediate portion.

It is presently preferred to make the improved clamp from metallic sheet stock.

The clamp which is shown in FIGS. 2 and 3 exhibits the advantage that the moment of resistance of its intermediate portions (only the portion 5' is actually shown) are much more pronounced than the moment of resistance of the median portion. As mentioned above, such clamps can be produced in a suitable upsetting, stamping or like machine by providing the intermediate portions with channels or grooves which extend longitudinally thereof and whose depth can increase gradually from the median portion toward the respective end portions.

It has been found that a clamp which comprises more than two convolutions, especially between 2.5 and 2.6 convolutions, is particularly suitable for a number of applications. In such clamps, each intermediate portion (without the neighboring end portion) preferably extends along an arc of approximately 360 degrees. The combined moment of resistance in the regions where three convolutions are adjacent to each other (as considered in the axial direction of the clamp) is highly satisfactory. Such portions are subjected primarily to bending stresses when the inner diameter of the clamp is increased, and they must furnish the maximal clamping force when the clamp is in actual use.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An annular clamp for hoses and like objects, said clamp being adapted to assume an expanded and an unexpanded condition and comprising a springy member forming at least one and a half neighboring convolutions having in the unexpanded condition of the clamp inner diameters which are smaller than the outer diameter of the object around which the convolutions are to be applied, said springy member including two substantially radially outwardly bent end portions, a median portion and two intermediate portions each connecting said median portion with a different one of said end portions, said median portion having a cross-sectional shape which deviates from the cross-sectional shapes of said immediate portions such that the moments of resistance of said immediate portions exceed the moment of resistance of said median portion.

2. The clamp of claim 1, wherein the length of each of said intermediate portions exceeds the length of the neighboring end portion.

3. The clamp of claim 1, wherein said median portion includes a central part which is remote from said intermediate portions, as considered in the circumferential direction of the annular clamp, and the cross-sectional area of said springy member increases at least substantially gradually from said central part toward said end portions.

4. The clamp of claim 1, wherein said member is a flat band.

5. The clamp of claim 1, wherein said member is a band having a substantially rectangular cross-sectional outline in said median portion and a substantially V-shaped depression in each of said intermediate portions.

6. The clamp of claim 1, wherein said member forms more than two convolutions.

7. The clamp of claim 6, wherein each of said intermediate portions forms at least one full convolution.

8. The clamp of claim 7, wherein each of said intermediate portions extends along an arc of approximately 360 degrees.

9. The clamp of claim 6, wherein said member forms between 2.5 and 2.6 convolutions.

10. The clamp of claim 1, wherein said member contains metallic material.

11. An annular clamp for hoses and like objects, said clamp being adapted to assume an expanded and an unexpanded condition and comprising a springy member forming at least one and a half neighboring convolutions having in the unexpanded condition of the clamp inner diameters which are smaller than the outer diameter of the object around which the convolutions are to be applied, said springy member including two substantially radially outwardly bent end portions, a median portion and two intermediate portions each connecting said median portion with a different one of said end portions, said median portion including a central part which is remote from said intermediate portions, as considered in the circumferential direction of the annular clamp, and the cross-sectional area of said central part being less than and the cross-sectional areas of said intermediate portions.

* * * * *